(12) United States Patent
Liang et al.

(10) Patent No.: US 8,841,569 B2
(45) Date of Patent: Sep. 23, 2014

(54) PRESS BUTTON AND PORTABLE COMPUTER USING THE SAME

(75) Inventors: Chen-Yi Liang, New Taipei (TW); Cheng-Hsiang Chuang, New Taipei (TW); Chun-Chien Chen, New Taipei (TW); Shun-De Bai, New Taipei (TW); San-Pao Kao, New Taipei (TW)

(73) Assignee: Wistron Corp., New Taipei (TW)

( * ) Notice: Subject to any disclaimer, the term of this patent is extended or adjusted under 35 U.S.C. 154(b) by 309 days.

(21) Appl. No.: 13/350,768

(22) Filed: Jan. 14, 2012

(65) Prior Publication Data

US 2012/0250251 A1    Oct. 4, 2012

(30) Foreign Application Priority Data

Mar. 28, 2011    (TW) .............................. 100205435 U (51) Int. Cl.
*H01H 1/10* (2006.01)
*H01H 13/705* (2006.01)
*H01H 3/12* (2006.01)
*G06F 1/16* (2006.01)

(52) U.S. Cl.
CPC ........... *G06F 1/1684* (2013.01); *H01H 13/705* (2013.01); *H01H 2221/016* (2013.01); *H01H 2221/03* (2013.01); *H01H 2231/042* (2013.01); *H01H 3/122* (2013.01); *H01H 2233/01* (2013.01); *H01H 2227/036* (2013.01)
USPC .......................................... 200/343; 200/344

(58) Field of Classification Search
USPC .................................................... 200/341–345
See application file for complete search history.

(56) References Cited

U.S. PATENT DOCUMENTS

| | | | | |
|---|---|---|---|---|
| 4,019,418 | A * | 4/1977 | Kimble et al. | 84/343 |
| 4,103,126 | A * | 7/1978 | DeNigris et al. | 200/557 |
| 4,430,531 | A * | 2/1984 | Wright | 200/5 A |
| 4,472,610 | A * | 9/1984 | Fuller et al. | 200/5 A |
| 4,613,736 | A * | 9/1986 | Shichijo et al. | 200/317 |
| 4,883,932 | A * | 11/1989 | Van Hout et al. | 200/339 |
| 5,207,317 | A * | 5/1993 | Bryde et al. | 200/457 |
| 7,034,718 | B2 * | 4/2006 | Hsu | 341/22 |
| 8,546,714 | B2 * | 10/2013 | Zhang et al. | 200/344 |
| 8,592,705 | B2 * | 11/2013 | Dai | 200/344 |
| 2002/0125118 | A1 * | 9/2002 | Douzono et al. | 200/314 |

* cited by examiner

*Primary Examiner* — Renee Luebke
*Assistant Examiner* — Ahmed Saeed (57) ABSTRACT

A flat press button is provided. The press button includes a base plate, a link member, and a cap. The link member is disposed on the base plate. The cap, having an embossed strip and a flange, pivots at the link member, wherein the embossed strip and the flange are formed at the opposing sides of the cap, and the embossed strip and the flange are operated in a pivotal swinging manner around a pivot axis to abut the base plate alternatively.

16 Claims, 7 Drawing Sheets

PRESS BUTTON AND PORTABLE COMPUTER USING THE SAME

CROSS REFERENCE TO RELATED APPLICATIONS

This Application claims priority of Taiwan Patent Application No. 100205435, filed on Mar. 28, 2011, the entirety of which is incorporated by reference herein

BACKGROUND OF THE INVENTION

1. Field of the Invention

The invention relates to a press button, and more particularly, to a flat press button.

2. Description of the Related Art

Press buttons are commonly used in nearly every electronic device, such as a portable personal computer. Since size reduction is a trend for the portable personal computer, every element disposed in the portable personal computer must be flat and light. A significant portion of the thickness and weight of the portable personal computer resides in the press button.

Figure 1:
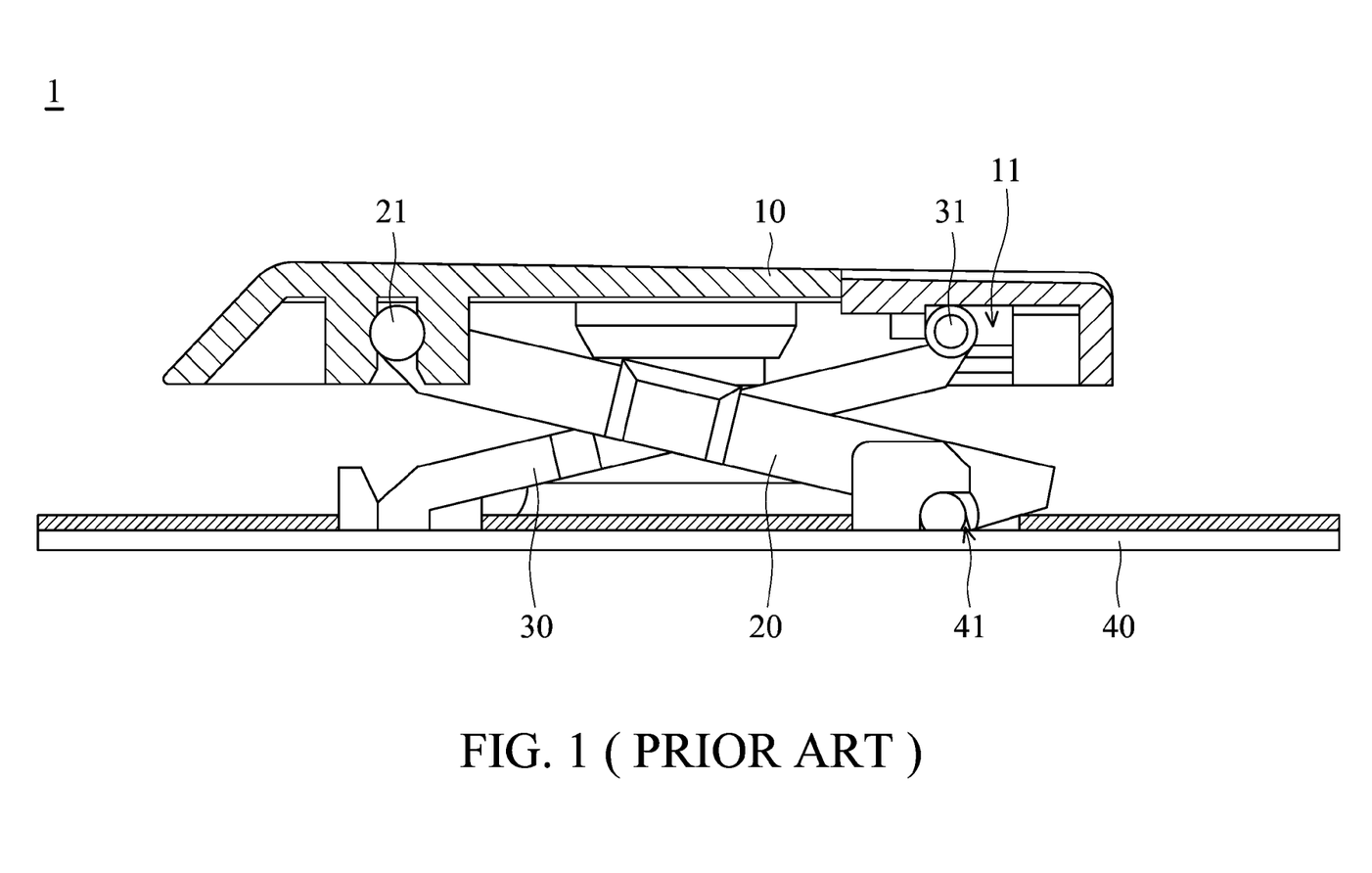
FIG. 1 depicts a cross-sectional view of a conventional press button.

Please refer to FIG. 1, a conventional press button 1 is shown in FIG. 1. The conventional press button 1 comprises a cap 10, two posts 20 and 30, and a button base 40. The two posts 20 and 30 pivot to each other in a scissors-like manner. Each end of the two posts 20 and 30 have a circular protrusion 21 and 31, and the cap 20 and the button base 40 have its own bores 11 and 41, wherein the circular protrusions 21 and 31 are received in the bores 11 and 41. Therefore, the cap 10 is supported on the button base 40 by the posts 20 and 30, and the cap 10 is allowed to move vertically relative to the button base 40.

However, such a scissors-like mechanism requires combining many components which complicates assembly operations. Furthermore, while moving, the requirement of a large moving profile of the cap is contrary to the requirement of a thin electronic device. Thus, a low profile press button mechanism design is seriously desired.

BRIEF SUMMARY OF THE INVENTION

Accordingly, an objective of the present invention is to provide a press button which is operated in a pivotal swinging manner so that the movement profile is reduced, and thus a thickness of the press button is diminished.

To achieve the above objective, a press button is provided. The press button includes a base plate, a link member, and a cap. The link member is disposed on the base plate. The cap, having an embossed strip and a flange, pivots at the link member, wherein the embossed strip and the flange are formed at the opposing sides sites of the cap, and the embossed strip and the flange are operated in a pivotal swinging manner around a pivot axis to abut the base plate alternatively, wherein the pivot axis is located between the embossed strip and the flange.

Another objective of the present invention is to provide a portable computer. The portable computer includes a housing, a control unit, and a press button. The control unit is connected to the housing, and the press button is disposed on the control unit. The press button includes a base plate, a link member, and a cap. The link member is disposed on the base plate. The cap, having an embossed strip and a flange, pivots at the link member, wherein the embossed strip and the flange are formed at the opposing sides sites of the cap, and the embossed strip and the flange are operated in a pivotal swinging manner around a pivot axis to abut the base plate alternatively, wherein the pivot axis is located between the embossed strip and the flange.

The press button of the present invention is operated in a pivotal swinging manner to replace the conventional press button which is moved vertically, so that a reduction of thickness is realized.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims In the conventional technology, an assembly operation of a press button is complicated due to complex structures, and a movement profile of the press button is too large resulting in hindrance when further decreasing the thickness of the press button. Therefore, for reducing the thickness of the press button, the present invention provides a flat press button.

Figure 2:
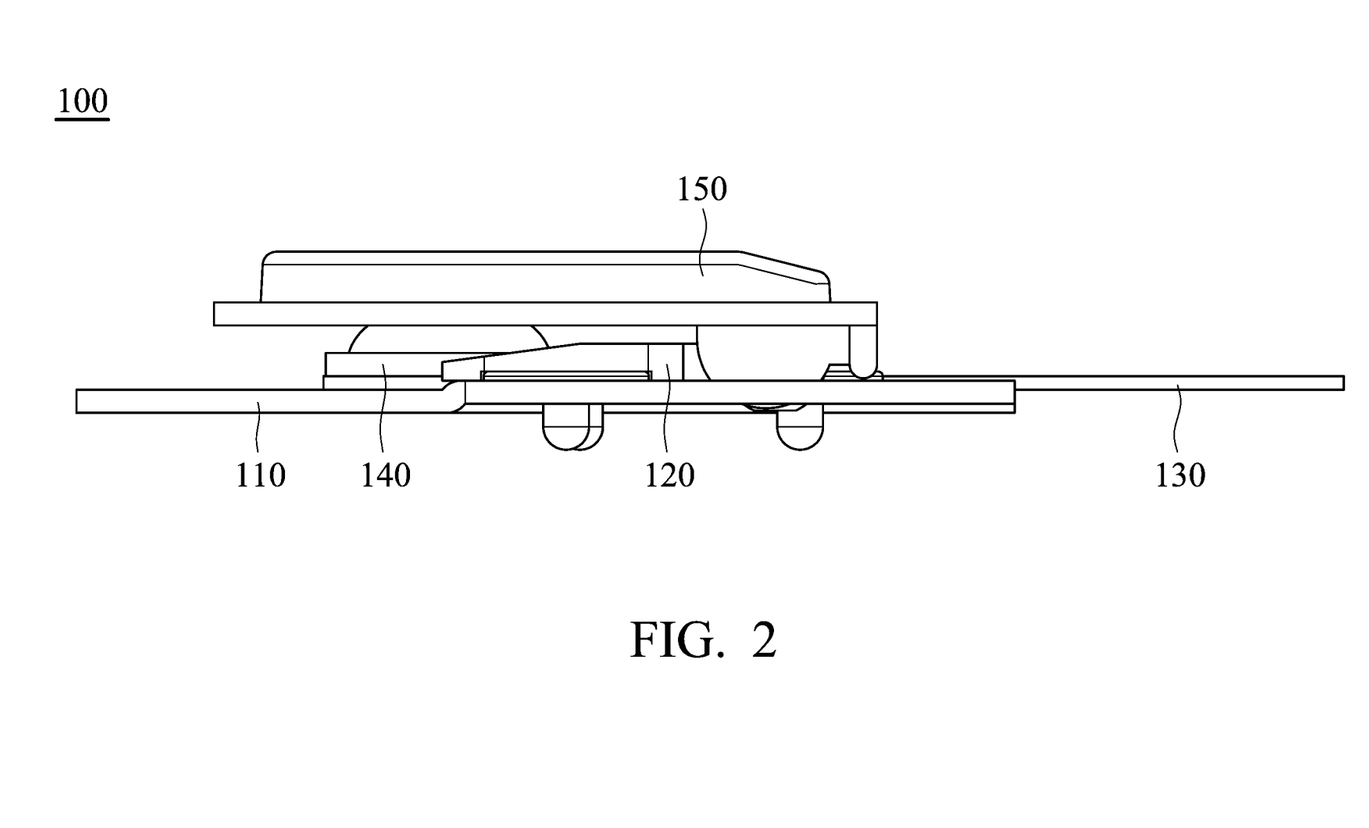
FIG. 2 depicts a side view of the press button in accordance with an embodiment of the invention.

Referring to FIG. 2, the press button 100 of the present invention includes a base plate 110, a link member 120, a circuit board 130, a resilient member 140 and a cap 150.

Figure 3A:
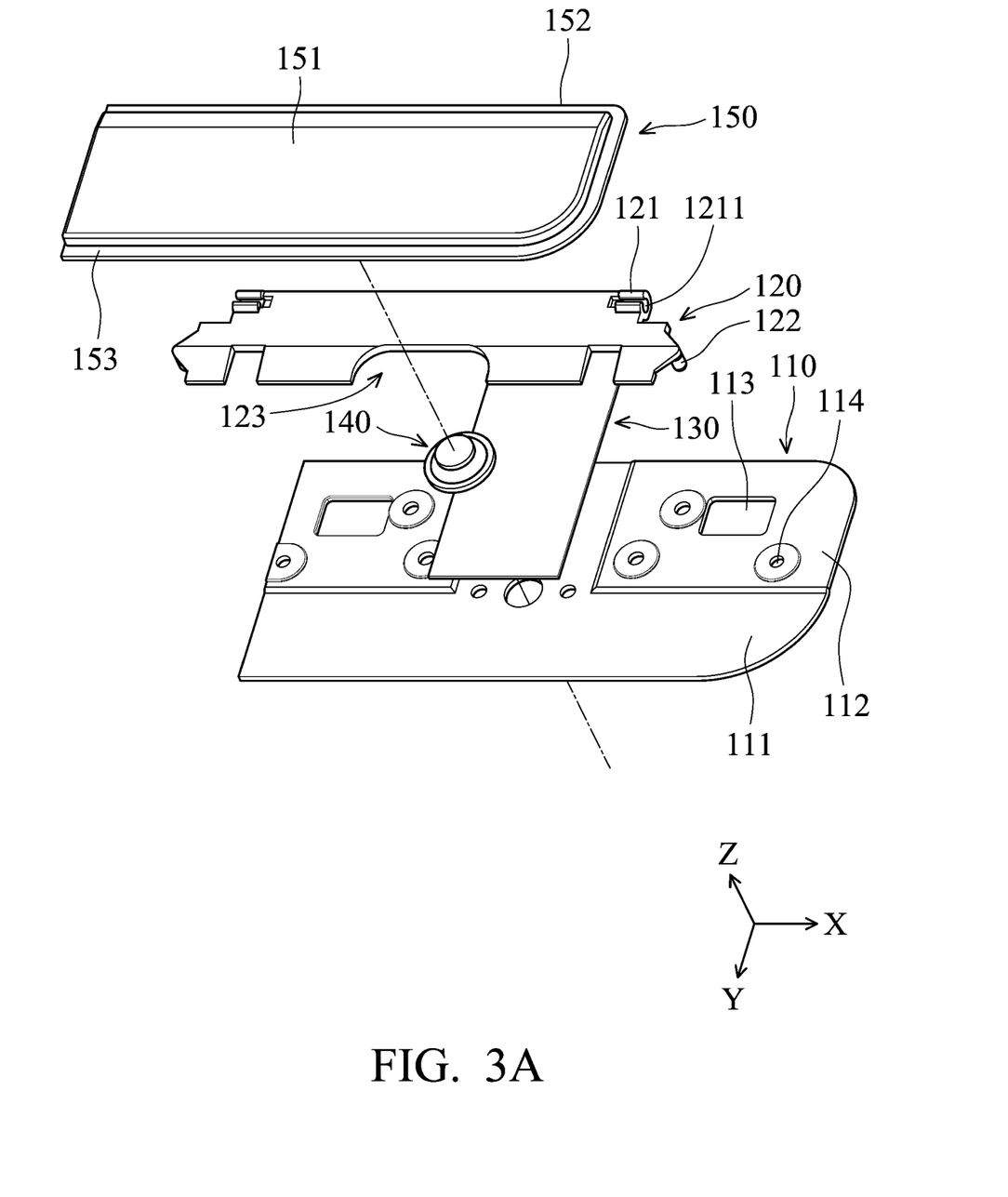
FIG. 3A is an explosive view of the press button in accordance with an embodiment of the invention.
Figure 3B:
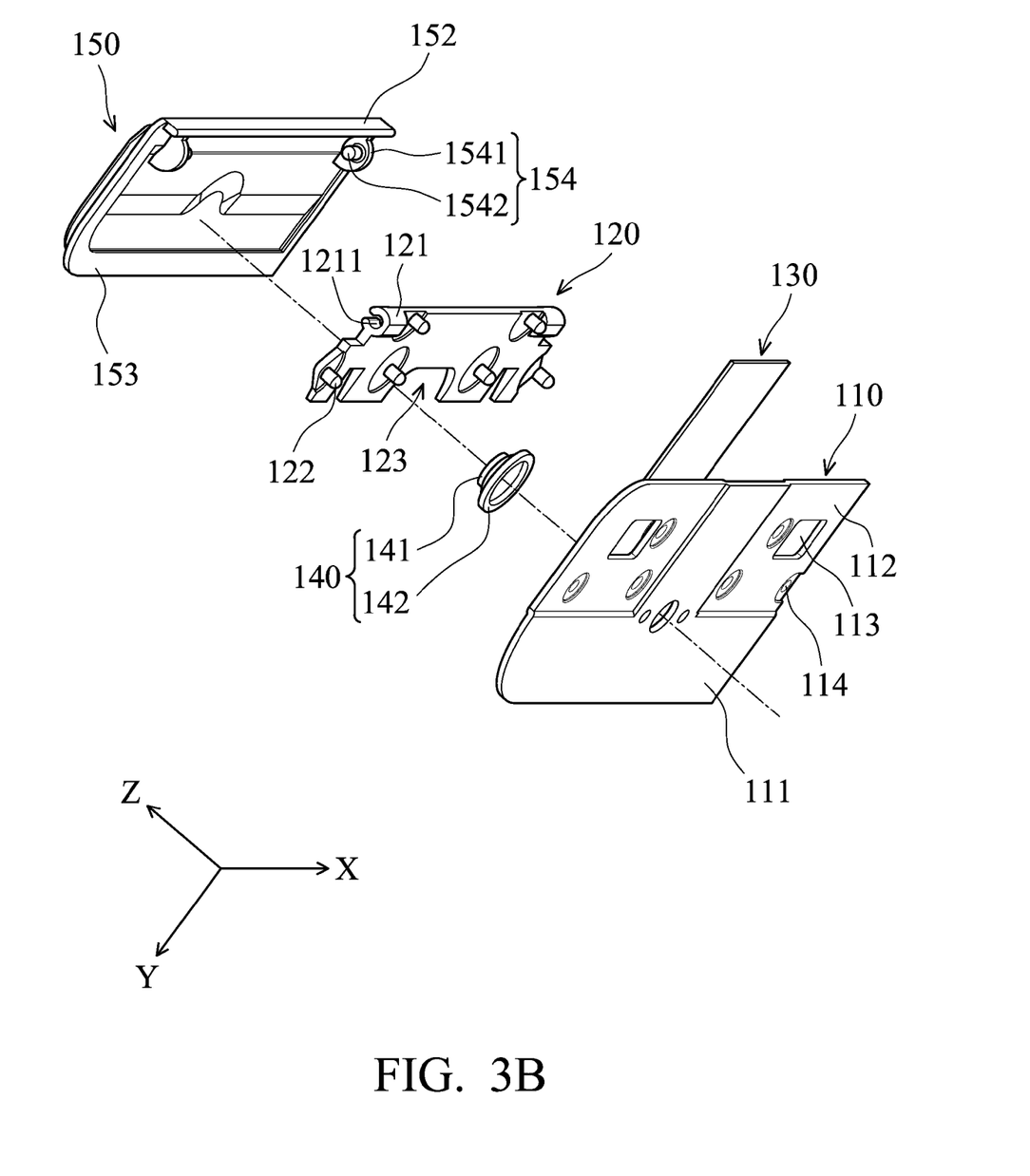
FIG. 3B is an explosive view of the press button in accordance with an embodiment of the invention.
Figure 4A:
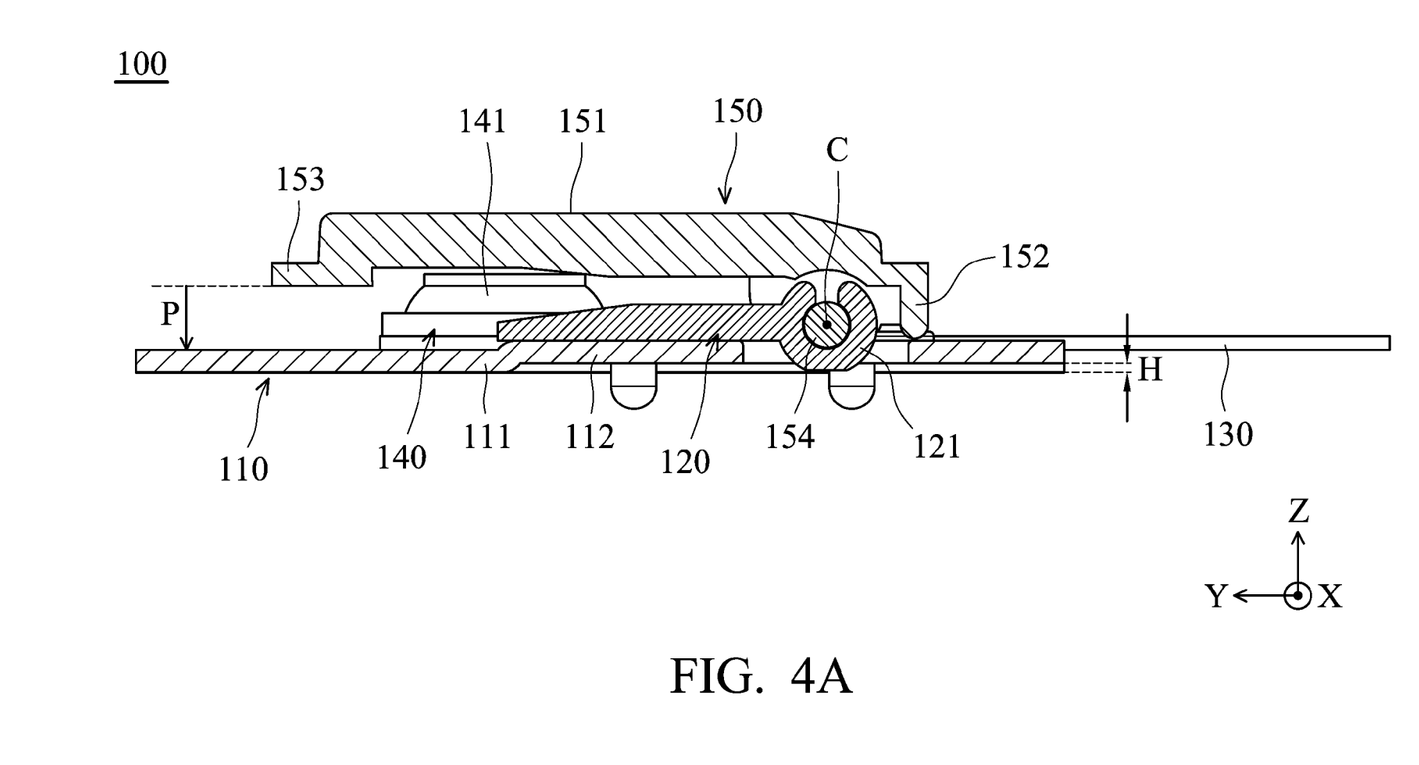
FIG. 4A is a cross-sectional view in accordance with an embodiment of the invention before the press button is pressed.

Referring to FIGS. 3A-4A, the base plate 110 is a metal member and has a first region 111 and two second regions 112, wherein the two second regions 112 are connected to the first region 111 and are embossed from the first region 111. Thus, a height difference H, as shown in FIG. 4A, is defined between the first region 111 and the two second regions 112. Each of the two second regions 112 has a through hole 113 and three positioning holes 114, wherein all of the through holes 113 and the positioning holes 114 penetrate the surface of the two second regions 112.

The link member 120 is made of a plastic material and includes two pivot holders 121, a plurality of positioning pins 122 and an opening 123. The pivot holders 121 are substantially C-shaped and are formed at one side of the link member 120, wherein each of pivot holders 121 has a bore 1211. It is noted that a part of the each pivot holder 121 is received in the through holes 113 of the base plate 110 to reduce the thickness of the press button 100. The positioning pins 122 corresponding to the positioning holes 114 are formed at the bottom side of the link member 120. Through the connection of the positioning pins 122 and the positioning holes 114, the link member 120 is disposed on the base plate 110 by thermoplastic adhesive techniques. Additionally, at a side of the link member 120 opposing the side where the pivot holder 121 is disposed, an opening 123 is formed.

The circuit board 130 is sandwiched between the link member 120 and the base plate 110 and is disposed at the surface of the first region 111. In this embodiment, the circuit board 130 is a flexible print circuit board, which is able to detect a pressing and further produce a digital signal.

The resilient member 140 is substantially a semi-circular sphere and has an upper portion 141 and lower portion 142, wherein the upper portion 141 protrudes from the lower portion 142. Associated with the opening 123, the lower portion 142 of the resilient member 140 is adhesively disposed on the circuit board 130. In this embodiment, the resilient member 140 is rubber, but it is not to be limited, as any component which is capable of being reshaped to an original shape after being compressed, can be applied as the resilient member 140 of the invention.

The cap 150 includes a pressing surface 151, an embossed strip 152, a flange 153 and two pivot members 154. The pressing surface 151 is defined at the upper surface of the cap 150. The embossed strip 152 is connected to a side of the pressing surface 151 and is extended toward a direction away from the pressing surface 151. Particularly, the embossed strip 152 is extended in a direction perpendicular to an extending plane of the pressing surface 151. Opposing the side where the embossed strip 151 is formed, the flange 153 is formed at another side of the cap 150 and extends outwardly. Specifically, the flange 153 is extended in a direction substantially parallel to the extending plane of the pressing surface 151. Additionally, a bottom surface of the cap 150 abuts the upper portion 141 of the resilient member 140.

Associated with the pivot holders 121 and adjacent to the embossed strip 152, the two pivot members 154 are disposed at the bottom surface of the cap 150. Each of the pivot members 154 has a retaining block 1541 and a pivot pin 1542. The retaining blocks 1541 respectively face the outer surfaces of the pivot holders 121. The pivot pins 1542 are associated with the bores 1211 of the pivot holders 121 and are formed at the inner surface of the retaining blocks 1541. While assembling the press button 100, the pivot pins 1542 are disposed in the bore 1211 so that the cap 150 is pivotally connected to the link member 120. After assembling, a pivot axis C is defined at a common axis of the pivot pins 1542 and the bores 1211. It is noted that the pivot axis C is located between the embossed strip 152 and the flange 153.

Through the connections of the pivot holders 121 and the pivot members 154, the cap 150 is constrained. Specifically, since a distance between the inner surfaces of the two retaining blocks 1541 is substantially equal to a distance between the outer surfaces of the two pivot holders 121, the retaining blocks 1541 are constrained by the pivot holders 121, i.e. a translatory displacement of the cap 150 along an X-axis direction is limited. Additionally, the pivot pins 1542 are connected inside the bores 1211 so a translatory displacement of the cap 150 along a Y-axis direction is limited. In this way, the cap 150 is able to pivot about the pivot axis C stably.

Furthermore, the length of the link member 120 in the Y-axis direction is smaller than the length of the cap 140 in the Y-axis direction so that the embossed strip 152 and the flange 153 do not overlap the link member 120 in a Z-axis direction.

Figure 4B:
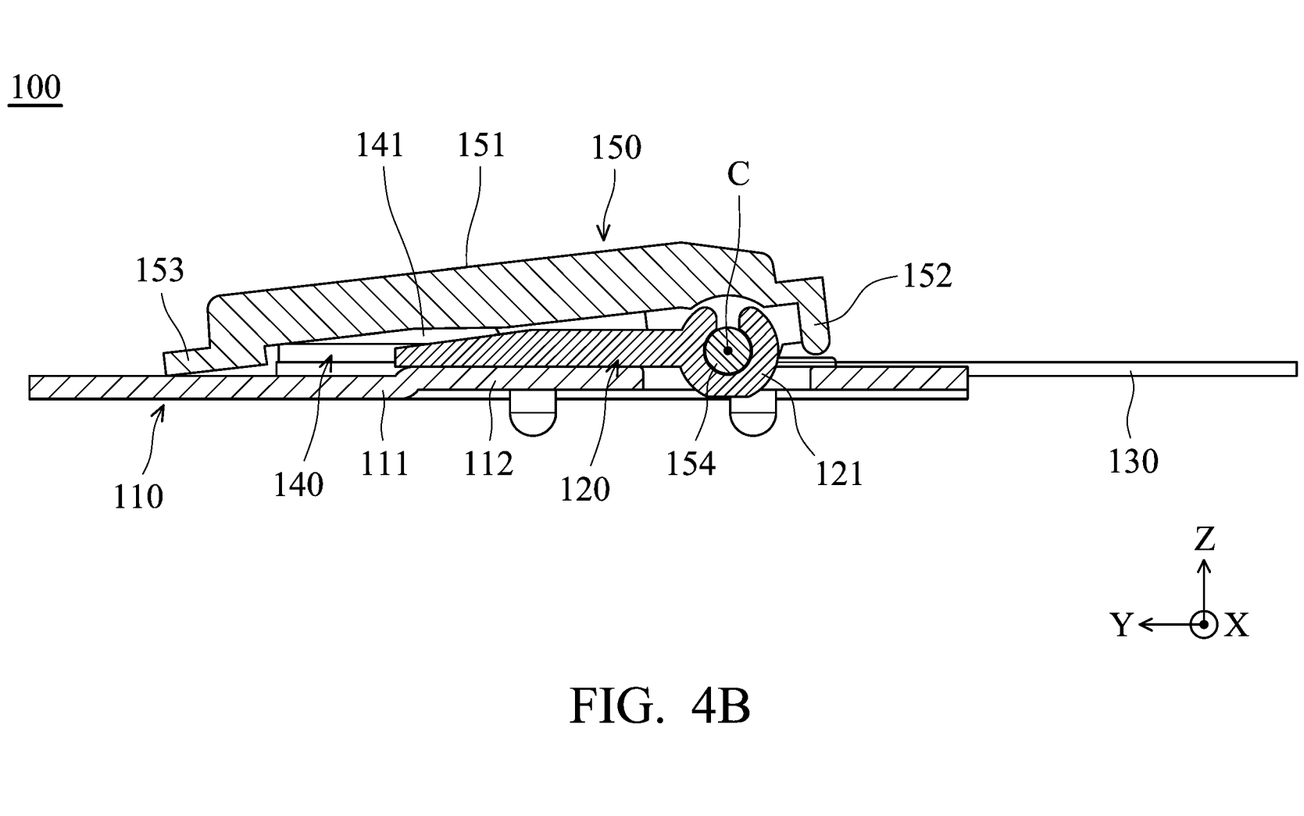
FIG. 4B is a cross-sectional view in accordance with an embodiment of the invention as the press button is pressed.

The working principle of the embodiment is described hereafter. Please refer to FIGS. 4A and 4B, wherein FIG. 4A is a cross-sectional view in accordance with an embodiment of the invention before the press button 100 is pressed; FIG. 4B is a cross-sectional view in accordance with an embodiment of the invention as the press button 100 is pressed.

Before the press button 100 is pressed, due to support by the resilient member 140, the embossed strip 152 of the cap 150 abuts the two second regions 112 of the base plate 110. After the pressing surface 151 is pressed by an external force, a moment occurs around the pivot axis C. Thus, the embossed strip 152 and the flange 153 pivot around the pivot axis C, and the flange 153 moves a predetermined displacement P. As shown in FIG. 4B, after the cap 150 is pressed, the flange 153 abuts the first region 111 of the base plate 110, and the upper portion 141 of the resilient member 140 is deformed along the Z-axis direction, which enables the circuit board 130 to detect a pressing and produce a digital signal. It is noted that, the embossed strip 152 is separated from the two second regions 112 as the first region 111 of the base plate 110 is abutted by the flange 153. Once the external force is released from the pressing surface 151, due to the resilient nature, the resilient member 140 provides a restoring force to push the cap 150 to its original position, as shown in FIG. 4A.

Figure 5:
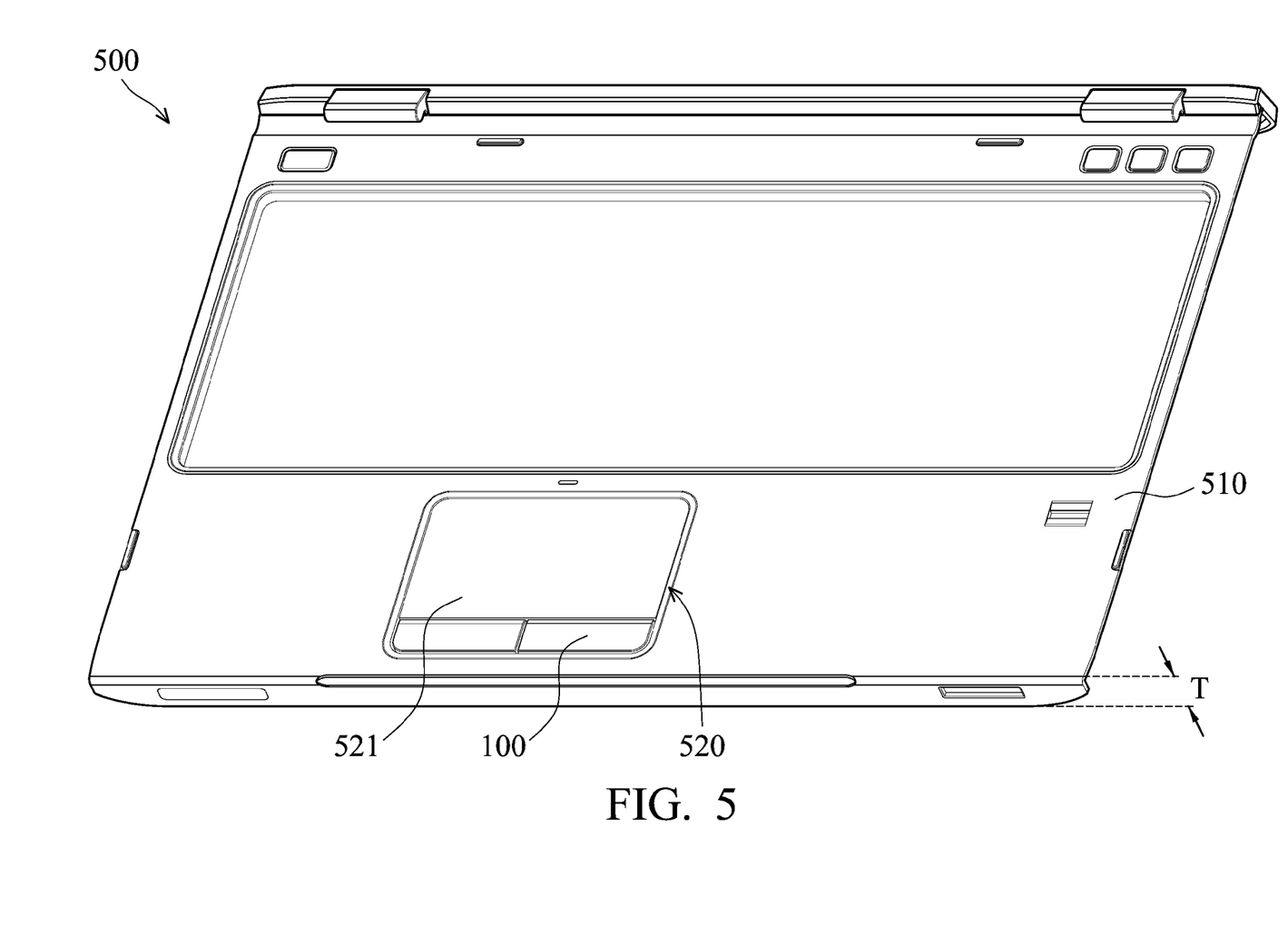
FIG. 5 illustrates a possible application of the invention being applied in a portable computer.

Referring to FIG. 5, FIG. 5 illustrates a possible application of the invention being applied in a portable computer 500. The portable computer 500 includes a housing 510 and a control unit 520. The control unit 520 is connected to the upper surface of the housing 510 and includes a touch panel 521 and two press buttons 100. The touch panel 521 detects a movement of a finger and produces a digital signal, and the press buttons 100 detect a finger pressing movement and produces a digital signal.

As noted above, the thickness of each component is of great concern when designing a portable computer 500, thus, the press button 100 with a thickness T successfully meets the requirement. Because the press button 100 of the present invention is operated in a pivotal swinging manner, it can replace the conventional press button which moves vertically.

Features of the invention are understood by the above descriptions. The press button of the present invention simplifies assembly operations by reducing the number of necessary components and further realizes a reduction in weight.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A press button, comprising:
   a base plate;
   a link member, disposed on the base plate; and
   a cap, having an embossed strip and a flange, pivoted at the link member, wherein the embossed strip and the flange are formed at two opposing sides of the cap, the cap being movable in a pivotal swinging manner around a pivot axis alternately between a first position in which the embossed strip abuts the base plate and a second position in which the flange abuts the base plate,
   wherein the pivot axis is located between the embossed strip and the flange.

2. The press button as claimed in claim 1, wherein the link member further comprises at least one pivot holder, and the cap further comprises a pivot member disposed in the pivot holder.

3. The press button as claimed in claim 2, wherein the pivot member is closer to the embossed strip than the flange.

4. The press button as claimed in claim 3, further comprising a resilient member, wherein the resilient member is received in an opening at a side of the link member.

5. The press button as claimed in claim 4, wherein the resilient member is rubber.

6. The press button as claimed in claim 2, wherein the base plate further comprises a through hole, and the pivot holder is received in the through hole.

7. The press button as claimed in claim 1, wherein the base plate further comprises a first region and a second region connected to the first region and protruded from the first region, wherein the embossed strip abuts the second region when the cap is in the first position, and the flange abuts the first region when the cap is in the second position, wherein the first region and the second region are planar.

8. The press button as claimed in claim 1, further comprising a circuit board disposed on the base plate, and a resilient member disposed on the surface of the circuit board.

9. The press button as claimed in claim 8, wherein the resilient member is rubber.

10. The press button as claimed in claim 1, further comprising a resilient member, arranged such that the resilient member supports the cap in the first position, and external pressure on a pressing surface of the cap deforms the resilient member and moves the cap into the second position.

11. A portable computer, comprising:
a housing;
a control unit, connected to the housing;
a press button, disposed on the control unit, comprising:
a base plate;
a link member, disposed on the base plate; and
a cap, having an embossed strip and a flange, pivoted at the link member,
wherein the embossed strip and the flange are formed at two opposing sides of the cap, the cap being movable in a pivotal swinging manner around a pivoting axis alternately between a first position in which the embossed strip abuts the base plate and a second position in which the flange abuts the base plate;
wherein the pivoting axis is located between the embossed strip and the flange.

12. The portable computer as claimed in claim 11, wherein the link member further comprises at least one pivot holder, and the cap further comprises a pivot member disposed in the pivot holder.

13. The portable computer as claimed in claim 12, wherein the pivot member is closer to the embossed strip than the flange.

14. The portable computer as claimed in claim 13, wherein the press button further comprising a resilient member, wherein the resilient member is received in an opening at a side of the link member.

15. The portable computer as claimed in claim 11, wherein the press button further comprises a circuit board disposed on the base plate, and a resilient member disposed on the surface of the circuit board.

16. The portable computer as claimed in claim 11, wherein the press button further comprises a resilient member, arranged such that the resilient member supports the cap in the first position, and external pressure on a pressing surface of the cap deforms the resilient member and moves the cap into the second position.

* * * * *